Patented Nov. 5, 1935

2,019,951

UNITED STATES PATENT OFFICE 2,019,951

DECORATIVE MATERIAL

Amerigo F. Caprio, Newark, N. J., assignor to Celluloid Corporation, a corporation of New Jersey No Drawing. Application March 26, 1931, Serial No. 525,615

3 Claims. (Cl. 154—46).

The present invention relates to the general class of decorative materials and particularly to the class of decorative thermoplastic materials.

An object of this invention is the production of patterned or effect materials, sheets, slabs or other articles or objects of any shape in materials having a basis of thermoplastic compositions containing derivatives of cellulose.

A further object of this invention is to produce novel decorative effects with transparent or translucent materials by employing relatively thin metallic foils.

Other objects of this invention will be apparent from the following detailed description and will be pointed out in the appended claims.

According to the present invention I employ, as a means for producing patterns or effects in or upon cellulose derivative or other suitable materials, relatively thin foils of metals. Such foils may be smooth or may have a pattern or design printed, painted or impressed thereon suitable for the pattern or effect to be produced and are placed on or between sheets of transparent or translucent thermoplastic or other material and subjected together therewith to a compositing operation under heat and pressure. The said foils are preferably coated with an adhesive composition in any suitable manner, such as spraying, dipping, etc.

The adhesive composition is preferably a thermoplastic lacquer, such as cellulose nitrate or cellulose acetate lacquer, containing high proportions of plasticizers and also some suitable gums, such as ester gum, gum elemi, gum dammar, etc. to improve the adhesive qualities of the said composition. I have found that resinous lacquers not employing cellulose esters or ethers as a base also give satisfactory results as adhesive coatings for the metal foil. An example of such an adhesive compound is polymerized vinyl acetate. If fact any adhesive, regardless of its composition, may be used provided that such adhesive will hold to the thermoplastic layers, either by the application of heat and pressure, or by spraying with suitable solvents.

The thermoplastic material may contain any suitable derivative of cellulose such as cellulose nitrate, (pyroxylin) or organic derivatives of cellulose. The organic derivatives of cellulose may be an organic ester of cellulose or cellulose ether. Examples of organic esters of cellulose are cellulose acetate, cellulose formate, cellulose propionate and cellulose butyrate, while examples of cellulose ethers are ethyl cellulose, methyl cellulose and benzyl cellulose.

Besides the derivative of cellulose, the thermoplastic composition may contain softening agents or plasticizers, pigments, dyes, filling materials and/or stabilizers such as urea, as is well understood in the art. Examples of plasticizers are camphor, castor oil, tricresyl phosphate, diethyl phthalate, dibutyl phthalate, dibutyl tartrate, paraethyl toluene sulfonamid, etc., the choice of which depends on the particular derivative of cellulose employed and on the particular use to which the thermoplastic composition is to be put.

In the compositing operation, the metal foil is coated with adhesive on one side when it is to be used as a backing for a single sheet of thermoplastic material or on both sides when it is to be laminated between two sheets of the thermoplastic material and then subjected together with the thermoplastic sheet or sheets to heat and pressure.

By this means I have found that materials, articles or objects can be reliably produced with patterns, designs or effects of any desired character, while avoiding the disadvantages previously encountered in the manufacture of patterned or effect materials or articles from thermoplastic compositions and metal foils. Such difficulties as loosening or separation of the metal foil when the composited material is subjected to the usual operations, such as routing, drilling, sawing, blanking, buffing, etc. are entirely overcome.

In carrying out my invention, I employ a relatively thin metal foil having a thickness of the order of 0.0005 to 0.006", preferably about 0.003". While I prefer to use aluminum foil, the foil may be made of other materials such as zinc, tin, nickel, copper or alloys, such as brass, duralumin, etc. In general, any metal or alloy may be employed provided it is not so soft as to smooth out or flatten under pressing conditions. On the whole I prefer to use aluminum, as it is strong, light, easily worked and the impressions thereon are not readily deformed.

The metal foil used as the decorative medium may be embossed and/or printed with any desired pattern or design by passing the same between embossing and/or printing rollers. This is one of the advantages of my invention as the embossing and/or printing may be accomplished at small cost.

It is to be understood that in some cases I may employ an undecorated foil and composite the same with a transparent or translucent thermoplastic sheet which is suitably decorated to produce the desired effect or I may even composite metal foil and a thermoplastic sheet, both of which are decorated.

My invention also lends itself to the production of artistic non-shatterable table tops. For this purpose, the top celluloid layer used for veneering and protecting the thin metal foil I employ film stock and for the base I use "cut" sheets of celluloid of heavier gauge.

In addition, my improved laminated product, besides having decorative value, possesses other advantageous qualities. For example, whereas celluloid or cellulose acetate exhibit insulating properties with respect to heat and electricity, by the use of metallic foils in combination with said substances it is possible to make them conductors thereof. This also applies to glass sheets laminated with these metallic foils, either alone or in conjunction with a thicker celluloid sheet, say 0.020".

The manner in which the invention may be carried out in practice is illustrated in the following example, it being understood that this is in no way limitative and can be varied widely without departing from the invention.

*Example*

A leaf of aluminum or other suitable metal 0.001" in thickness and having the desired design thereon is coated with an adhesive solution comprising cellulose nitrate or cellulose acetate lacquer containing high proportions of plasticizers and also some suitable gums. This leaf is then placed on a sheet of transparent celluloid and then subjected to the necessary application of pressure, for example, in a heated hydraulic press, to unite the two sheets which results in a decorative material.

The term "effect materials" used hereinafter in the claims is to be understood as including patterned or effect materials, sheets, slabs, or other articles or objects, while the term "derivative of cellulose" embraces within its scope cellulose esters, such as nitrocellulose, cellulose acetate, cellulose propionate as well as cellulose ethers, such as methyl cellulose, ethyl cellulose, benzyl cellulose, etc.

It is to be understood that the foregoing detailed description is given merely by way of illustration and that many variations may be made therein without departing from the spirit of my invention.

Having described my invention, what I claim and desire to secure by Letters Patent is:

1. Decorative article comprising a relatively thin metal foil having an embossed design thereon and secured, with the aid of an adhesive, to a transparent facing sheet of a thermoplastic material containing a derivative of cellulose and to a backing sheet of a thermoplastic derivative of cellulose.

2. Decorative article comprising a relatively thin metal foil having an embossed design thereon and secured, with the aid of an adhesive, to a transparent facing sheet of cellulose acetate and to a backing sheet of cellulose acetate.

3. Decorative article comprising a relatively thin metal foil having an embossed design thereon and secured, with the aid of an adhesive, to a transparent facing sheet of celluloid and to a backing sheet of celluloid.

AMERIGO F. CAPRIO.